United States Patent
Offner

[15] 3,686,506
[45] Aug. 22, 1972

[54] LIGHT CONTROL SYSTEM FOR AUTOMOBILES

[72] Inventor: Franklin F. Offner, 1890 Telegraph Road, Deerfield, Ill. 60015

[22] Filed: Oct. 7, 1970

[21] Appl. No.: 78,679

[52] U.S. Cl. .................................307/10 LS, 315/83
[51] Int. Cl. ...............................................H02g 3/00
[58] Field of Search .....315/83, 82; 307/10 R, 10 BP, 307/10 LS

[56] References Cited

UNITED STATES PATENTS

| | | | |
|---|---|---|---|
| 2,806,980 | 9/1957 | Shapiro | 315/83 |
| 3,373,312 | 3/1968 | Conn | 315/83 |

*Primary Examiner*—Herman J. Hohauser
*Attorney*—Pierce, Scheffler & Parker

[57] ABSTRACT

A control system for the lights of an automobile in which the electrical circuit for the lights is normally passed through the ignition switch so as to interrupt the lighting circuit whenever the ignition switch is turned to its "off" position. To enable the lights to be operated when the ignition switch is "off", an auxiliary switch is utilized which can be set to by-pass the lighting circuit from the light control switch around the ignition switch directly to the battery and this auxiliary switch is automatically reset whenever the light control switch is moved to its "off" position.

2 Claims, 3 Drawing Figures

Patented Aug. 22, 1972
3,686,506
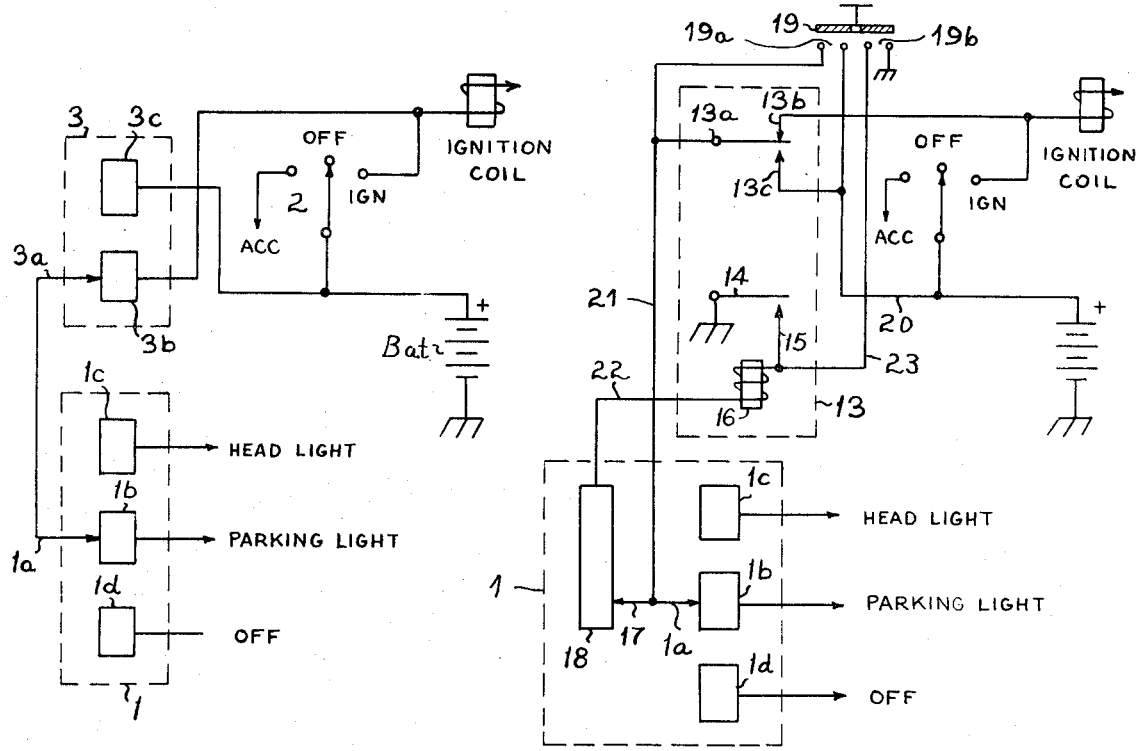
Fig. 1
Fig. 3
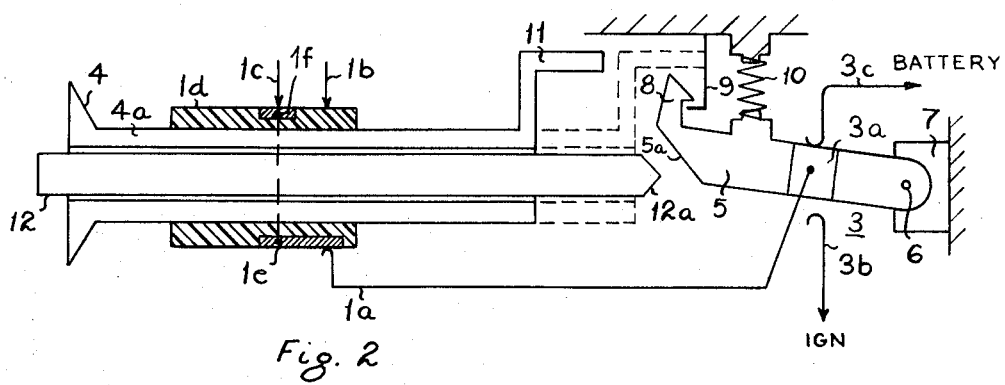
Fig. 2
INVENTOR.
Franklin F. Offner
BY
Prince, Schaffler & Parker
Attorneys

LIGHT CONTROL SYSTEM FOR AUTOMOBILES

This invention relates in general to an improved control system for the lights of an automobile which is designed to extinguish the lights in an automatic manner whenever the ignition switch is turned to the "off" position, thus to avoid the possibility of accidentally draining the battery of its charge in the event the operator should inadvertently forget to turn the light control switch to its off position when leaving the automobile.

Safety control systems of this type have already been designed and patents issued covering various modes of attaining the desired result. However, the present invention is believed to offer a more simple approach to the problem from the standpoint of application to conventional lighting and ignition control systems.

SUMMARY OF THE INVENTION

In accordance with the present invention, an auxiliary switch is arranged in series with an essentially conventional manually operated light control switch, this auxiliary switch providing alternative paths to the battery. In a first normal position of the auxiliary switch, the circuit from the light control switch is required to pass through the conventional ignition switch of the automobile to the battery so that the lighting circuit can be completed only when the ignition switch is in its "on" position. In a second, by-pass position of the auxiliary switch is designed to be set by the operator, the circuit from the light control switch by-passes the ignition switch and extends directly to the battery thus enabling lights, such as for example, parking lights, to be turned on even though the ignition switch has been turned to the "off" position.

In accordance with the invention, the auxiliary switch whenever set to its second position by the operator is automatically reset to the first position when the operator moves the light control switch to its "off" position, thus avoiding the possibility of leaving the auxiliary switch in its ignition by-pass position which would, of course, circumvent the general intention to prevent the lights from being inadvertently left on when the ignition switch is turned off, thus running down the battery.

In one embodiment of the invention the auxiliary switch is formulated as a mechanically operating latching switch situated to the rear of the conventional manually operated light control switch, this switch being actuated to a latched, ignition switch by-pass position by means of a push rod which extends through the body of the light control switch, the switch being unlatched whenever the light control switch is shifted to its "off" position.

In a second embodiment of the invention, the auxiliary switch is formulated as an electrical relay with a set of holding contacts to maintain the switch contacts in the ignition by-pass position, the relay being energized by momentary operation of a push button type of switch, and the relay being de-energized automatically upon movement of the light control switch to its "off" position.

The embodiments will now be described in detail and are illustrated in the accompanying drawings wherein:

FIG. 1 is a schematic electrical circuit diagram illustrating the basic arrangement in which the auxiliary switch is arranged in series with the light switch so that the circuit controlling the lights can be alternatively established either indirectly to the battery through the ignition switch so as to interrupt the light circuit automatically whenever the ignition switch is turned off, or directly to the battery thus by-passing the ignition switch.

FIG. 2 is a view of one embodiment of the invention wherein the auxiliary switch is formulated as a mechanically operating latching switch, the switch being set manually to its ignition switch by-pass position and being reset automatically to its other position establishing control over the lights through the ignition switch by movement of the light switch to its off position; and FIG. 3 is an electrical schematic of a modified embodiment of the invention similar in principle to the embodiment of FIG. 2 but wherein the auxiliary switch is formulated as an electrical relay.

With reference now to the embodiment illustrated in FIG. 1, the light control switch for the automobile is indicated in general by numeral 1, the ignition switch by numeral 2, and an auxiliary switch — which forms an important component of the invention — by numeral 3. In the rather simple form which has been illustrated, the light control switch 1 is provided with three contacts, contact member 1a being a movable contact actuated by hand which is adapted to be shifted rectilinearly from an "off" position 1d to engage either of two stationary contacts 1b, or 1c. Contact 1b provides a circuit connection through to the parking lights and contact 1c provides a similar circuit connection through to the headlights. However, it will be understood that the switch 1 may also include other contacts so as to provide for energization of fog and other auxiliary lights, etc. in accordance with standard automotive practice; these latter do not alter the manner in which the invention is applied.

In accordance with usual wiring practice for automobiles, one side of the circuit for each light is grounded as is also one side of the battery supply source "B at," and the other side of the light circuit leads through the stationary contacts 1b, 1c, etc. and the movable contact 1a and thence ultimately to the other side of the battery thus to complete the circuit for the particular light or lights involved.

In accordance with the present invention, the circuit from the movable contact 1a on the light switch does not lead directly to the battery but rather is connectible to the battery through a novel circuit which includes an auxiliary switch 3 and the ignition switch 2.

The ignition switch is of the conventional type, and may, as now standard, have three positions if desired, these being "off," "ignition" or "accessory." The accessory position (acc.) provides for turning on any accessary such as a radio even though the motor is not running. Also, when in the ignition position, the switch may be turned further to also energize the starter for the motor, which is now standard practice. The movable contact of the ignition switch is connected through to one side of the battery.

Auxiliary switch 3 includes one contact member 3b which is connected electrically to the ignition contact on the ignition switch, and a second contact member 3c which is connected electrically, and in a direct manner, to the positive side of the battery, the negative side being the one which is usually grounded. Also included is a third contact member 3a which can be shifted alternatively into contact with either of the other two contact members 3b and 3c. This third contact member 3a is connected electrically to contact member 1a of the main light control switch 1.

When the ignition switch is in the ignition position i.e. when the motor is running, switch contact member 3a is normally engaged with contact member 3b and thus when the automobile is stopped and the ignition switch turned to the "off" position, any illuminated lights will also be turned off even though the light switch is inadvertently left in one of its "on" positions. However, to enable lights such as the parking lights to be turned on even when the ignition switch has been turned off, the auxiliary switch 3 is actuated to bring contact 3a into engagement with contact 3c thus bypassing the ignition switch and establishing a circuit directly from the battery to the lights through the light control switch.

However, it will now be self-evident that while the auxiliary switch 3 remains in this position, automatic cut-off control over the lights by means of the normal circuit connections through the ignition switch is no longer available since the circuit through the ignition switch is now effectively by-passed. Thus, the next time the automobile is used and the lights turned on, the lights could be inadvertently left on unless the operator had remembered to reset the auxiliary switch to its normal position after having used it for turning on lights with the ignition switch off.

The present invention accomplishes this desirable reset of switch 3 automatically when the light switch is returned to the "off" position through use of a latching switch associated with the light switch. The latching switch can take various physical forms, and two will now be described, one being mechanical and the other electrical.

A latching switch arrangement of the mechanical type is illustrated in FIG. 2. Here it will be seen that the light control switch 1 is of the conventional push-pull type, the switch operator knob 4 being pulled out to turn on the lights and conversely pushed back to turn them off. When the knob 4 is pulled out, it carries with it a shaft 4a on which is mounted a sleeve of insulating material 1d corresponding to 1d in FIG. 1 and which supports a long contact strip insert 1e on one side engageable with contact member 1a, and a shorter contact strip insert 1f on the opposite side engageable alternatively with contact members 1b or 1c, which have the same functions as like identified contact members in the circuit depicted in FIG. 1. Contact insert 1e and 1f are electrically interconnected as indicated by the broken line which extends between them. With knob 4a in the fully pulled out position, as depicted in the drawing, contact member 1a connects electrically with contact member 1c by way of the electrically interconnected contact strip inserts 1e and 1f. With the knob in a partially pushed in position, contact member 1a connects electrically with contact member 1b by way of the electrically interconnected contact strip inserts 1e and 1f. With the knob in the fully pushed in position, contact member 1a breaks its engagement with contact strip 1e by running off the end of the latter onto the insulating sleeve 1d.

Auxiliary switch 3 is situated to the rear of the main light switch 1 and in general is in horizontal alignment therewith. Switch 3 includes a latchable contact arm 5 pivotally connected at its rear end 6 to a stationary support 7. This contact arm mounts the previously mentioned contact member 3a which is electrically connected by suitable conductor means to contact member 1a on the main light control switch, and the arm is movable from a normally horizontal position in which contact member 3a engages a stationary contact member 3b, to an upper position, the position depicted in FIG. 2, wherein contact member 3a engages contact member 3c. The forward end 5a of contact arm 5 is tapered for effecting a slidable camming engagement between it and the rear end 12a of a spring loaded push rod 12 which passes through a longitudinal bore provided in the body of the light switch 1. When rod 12 is pushed in against the restoring spring force, with light switch 1 in one of its "on positions," the sliding contact between the end 12a and the forward tapered end 5a of contact arm 5 causes the arm to pivot upwardly, breaking the engagement between contact members 3a, 3b and establishing an engagement between contact members 3a and 3c. Moreover, a latching nose 8 on the forward end of the contact arm is then engaged and held by one end of a cantilever spring blade 9 so as to retain the contact arm in the raised position. As previously explained with respect to the circuit diagram of FIG. 1, whenever contact members 3a and 3c become engaged, the energizing circuit for the lights bypasses the normal safety control through the ignition switch and the lights can then be turned on for parking, or other purposes by actuating the light switch 1, regardless of the position of the ignition switch.

When the parking or other lights are no longer necessary and are turned off, the latch on switch 3 will be released and returned to its normal position whereby the normal safety control of the light circuit through the ignition switch is restored. In order to effect release of the switch 3, it will be seen that the rear end of the shaft 4a on the main light switch 1 is provided with an offset reset arm 11 which is aligned with the middle portion of the latching spring blade 9 so that when the light switch knob 4 has been pushed in to the "off" position the end of reset arm 11 will push against spring blade 9 and release the lower end from the toe 8 on contact arm 5. A biasing spring 10 engaging the contact arm 5 then functions to restore the arm to its horizontal position and effect reengagement between contact members 3a, 3b.

The same functions can be performed through use of an auxiliary switch in the form of an electrically operated latching relay which is released when the main light switch has been shifted back to its "off" position. Such an arrangement is illustrated in FIG. 3. The latching relay has been designated 13 to distinguish it from the previously described mechanical structure. It includes a blade contact member 13a which operates between stationary contact members 13b, 13c and these three contact members perform the same function as the previously described contact members 3a, 3b and 3c. In addition, relay 13 includes another set of contacts which function as a hold-down or latch, these being a grounded blade contact member 14 which is adapted to engage a stationary contact member 15 when the relay is energized. The contact members are actuated by means of a solenoid 16 the coil of which receives its energizing current through a set of auxiliary contact members 17, 18 on the main light switch 1 which make contact with each other whenever any lighting function is selected by switch 1, the contact member 17 being connected electrically to contact member 1a which is not only connected to contact member 13a but also connectible to the positive side of the battery through contacts 19a of a push button type of switch 19.

In this embodiment, when it is desired to turn on lights with the ignition switch in the "off" position, the light switch 1 is actuated to one of its "on" positions, contact 1b or 1c, and push button switch 19 is then actuated momentarily thus to close a circuit for energizing the coil of solenoid 16. This energizing circuit can be traced from the positive side of the battery through conductor 20, now-closed switch contacts 19a, conductor 21, contact members 17, 18 conductor 22, the coil of solenoid 16, conductor 23 and the now-closed switch contacts 19b to ground. Energization of solenoid 16 functions to transfer contact member 13a from contact member 13b to contact member 13c and also effect closure of the hold-down contact members 14, 15 which serve to maintain the coil energized, i.e. it provides a ground connection after the push button switch 19 has been released and the original ground opened by opening of contacts 19b. When the lights are no longer desired, light switch 1 is moved to its "off" position thus interrupting the energizing circuit for solenoid 16 since engagement between auxiliary contact members 17,18 included in the energizing circuit for the solenoid is then interrupted.

While only two embodiments of my invention have been described and illustrated, it will be understood that these are typical rather than limitative of the scope of the invention as defined in the claims below since other but equivalent physical forms of the auxiliary switch may be devised in accordance with the invention which resides in the principal concept of resetting the auxiliary ignition by-passing switch to its normal safety position when the main light control switch has been actuated back to the "off" position following use of the light for parking or other purposes during a period when the ignition switch is in its "off" position.

I claim:

1. In a system for controlling the lights of an automobile of the type in which its engine is controlled by an ignition switch connected between the battery and engine, the combination comprising a primary manually operated light control switch disposed in and controlling a lighting circuit leading from the lights through said ignition switch to the battery for enabling the lights to be turned on when said ignition switch is in its "on" position, said lighting circuit being opened automatically whenever said ignition switch is turned to its "off" position, an auxiliary switch of the mechanical latching type connected into and controlling the lighting circuit, said auxiliary switch including first and second sets of contacts actuated thereby and which are alternatively connected in series with the contacts of said primary light control switch, the contacts of said second set being open and the contacts of said first set being closed when said auxiliary switch is in its unlatched position thereby to complete a lighting circuit through any closed contacts on said primary light control switch and said ignition switch when said ignition switch is in its on position, manually operated means for actuating said auxiliary switch to its latched position thereby to open the contacts of said first set and close the contacts of said second set thereby to complete another lighting circuit leading from any closed contacts on said primary light control switch directly to said battery thus bypassing the circuit through said ignition switch and enabling the lights to be turned on even though the ignition switch is in its "off" position, and means located on said primary light control switch and actuated by movement thereof to its "off" position to effect a release of said auxiliary switch from its latched position and restoration to its unlatched position thereby to effect opening of the contacts of said second set and reclosure of the contacts of said first set.

2. A system as defined in claim 1 for controlling the lights of an automobile wherein said auxiliary light control switch is located adjacent one end of said primary light control switch and is spring loaded to its unlatched position, wherein said manually operated means for actuating said auxiliary switch to its latched position is constituted by a rod type actuating member extending through the body of said primary light control switch and wherein said means located on said primary light control switch to effect release of said auxiliary switch from its latched position is constituted by a reset arm engageable with and which is effective to actuate a latch releasing member.

* * * * *